United States Patent
Kiet et al.

(10) Patent No.: US 8,804,915 B2
(45) Date of Patent: Aug. 12, 2014

(54) REMOTE VIRTUAL SUPERVISION SYSTEM

(75) Inventors: Quyen Kiet, Anaheim, CA (US); Barry Goldstein, Las Vegas, NV (US)

(73) Assignee: Gold Post Technologies, Inc., Las Vegas, NV (US)

(*) Notice: Subject to any disclaimer, the term of this patent is extended or adjusted under 35 U.S.C. 154(b) by 194 days.

(21) Appl. No.: 13/547,666

(22) Filed: Jul. 12, 2012

(65) Prior Publication Data

US 2013/0120518 A1 May 16, 2013

Related U.S. Application Data

(60) Provisional application No. 61/559,352, filed on Nov. 14, 2011.

(51) Int. Cl.
*H04M 11/04* (2006.01)

(52) U.S. Cl.
USPC .................................. 379/38; 348/14.02

(58) Field of Classification Search
USPC ............. 348/14.01, 14.02; 379/38, 39, 42, 45
See application file for complete search history.

(56) References Cited

U.S. PATENT DOCUMENTS

| | | | |
|---|---|---|---|
| 2002/0067272 A1* | 6/2002 | Lemelson et al. | 340/573.4 |
| 2005/0068169 A1* | 3/2005 | Copley et al. | 340/539.13 |
| 2007/0159343 A1* | 7/2007 | Crucilla | 340/573.4 |
| 2010/0204600 A1* | 8/2010 | Crucilla | 600/532 |
| 2012/0298119 A1* | 11/2012 | Reese et al. | 128/875 |
| 2014/0002575 A1* | 1/2014 | Fennell | 348/14.02 |

OTHER PUBLICATIONS

"Launching the First of its Kind, C.B.I.S.", Los Angeles County Sheriff's Department, 2010.

* cited by examiner

*Primary Examiner* — Olisa Anwah
(74) *Attorney, Agent, or Firm* — Wang Law Firm, Inc.; Li K. Wang; Stephen Hsu

(57) ABSTRACT

An apparatus and method that enables a case officer to monitor in remotely to P/Ps. The remote supervision server receives GPS data/time-date data/text/audio/video reporting periodically from the parolees and probationers and the GPS data/time-date data/text/audio/video reporting is analyzed. The remote supervision server will send an alert to the case officer if a suspicious behavior is detected. If no suspicious is detected, the remote supervision server will store the analysis result and send a notification to the case officer. The case officer can then check the audio/video reporting and the analysis result later. The remote supervision server also calculates the likelihood of recidivism for each post-release supervised client, parolee or probationer and advises the officer of such risk in order of greatest risk to lowest risk.

20 Claims, 6 Drawing Sheets

REMOTE VIRTUAL SUPERVISION SYSTEM

RELATED APPLICATION

This application is a non-provisional of the U.S. Provisional Application for Remote Virtual Supervision System, U.S. Provisional Pat. App. No. 61/559,352, filed on Nov. 14, 2011, the specification of which is included in its entirety by this reference.

BACKGROUND OF THE INVENTION

1. Field of the Invention

The present invention generally relates to a computer server, and more specifically, relates to a server that receives transmissions of GPS data, text message data, status data relating to community re-entry programs (job training, temporary housing, rehabilitation, drug testing, life coaching, and similar re-entry programs), social services data, school data, demographic data, time and date data, analyzes these transmission data, and generates results according to the analysis.

2. Description of the Related Art

Each local government spends considerable money tracking and monitoring post release convicts living within the county after they are released from incarceration. After a convict is approved for release from incarceration, he may be subject to parole, probation, or some form of post-release supervision. Usually, the parolee/probationer ("P/P") must register with a local authority and he is assigned a case officer with whom he must check in periodically. A case officer is usually charged with one hundred or more P/Ps and he must make time to monitor and track each P/P. The P/P must physically report to the case officer personally on a periodic basis.

Each local government must provide enough case officers for a given population of P/Ps to handle in person meetings with the P/Ps, whether in office or in the field. Most of the time, these reporting meetings are routine and no issues result from these meetings. Even though these meetings are routine and without any important issue to be resolved, the P/Ps still need to report every month (or whatever the required frequency is mandated). This in person reporting system is an obstacle for P/Ps who have jobs or have no access to transportation. The P/P must take time off work and arrange for travel to the case officer's office for a short appointment. The case officer, on the other hand, must make himself available under his supervision; if either the case officer or the P/P is running late, it puts the rest of the case officer's appointments behind schedule, forcing appointments to be rescheduled. However, with jail overcrowding become a drain on states and counties, the case officer's P/P caseload has been growing dramatically without a corresponding growth in resources to help manage this larger case load. Case officers now have to determine which P/Ps are at greatest risk of recidivism requiring immediate intervention and which P/Ps are a lesser risk and to leave them alone. Case officers do not want to waste their time with well-behaved P/Ps when there are at risk P/Ps that require close monitoring and intervention to prevent recidivism. The challenge for case officers is determining and prioritizing which P/Ps are at greatest risk of recidivism requiring the most of amount of intervention.

In this setting, a lot of time and resources are wasted by case officers personally meeting with low risk P/Ps or responding to an incident where his P/P already committed a crime (recidivate) instead of taking the initiative to help those P/Ps at greatest risk of recidivism. Preventing recidivism saves municipal money and resources by avoiding costs related arrest, incarceration and prosecution. Further, the setting described above follows a reactive model, i.e., the case officer monitors a P/P and reacts to what the P/P does or does not do. The case officer does not have information to anticipate possible what may happen to the P/P, thus the case officer cannot act more proactively to guide the P/P to become a productive member of the society.

Therefore, there is a need for a monitoring and management system that is based on a "recidivism prevention model" which enables case officers to handle a larger case load by anticipating which P/Ps are at greatest risk to recidivate and it is this system that the present invention is primarily directed to.

SUMMARY OF THE INVENTION

In one embodiment, there is provided a method for an apparatus, for remote reporting of low risk P/Ps. The apparatus comprises a data communication controller for transmitting and receiving P/P reporting information including GPS, text message, time/date, audio and video data from the P/P's remote device, an analyzer for analyzing the GPS, text message, time/date, audio and video data against a set of standard behavior indicators and a set of P/P past behavior indicators, a central processing unit for issuing an alert to a case officer if suspicious activities were detected by the analyzer, and a storage unit for storing and updating the set of standard behavior indicators.

In another embodiment, there is provided a method for remote monitoring a P/P. The method comprises the steps of receiving, through a telecommunication network, reporting information from the P/P, analyzing by an analyzer the reporting information, obtaining an analysis result, sending by a data communication controller an alert message to a case officer if a suspicious behavior has been detected in the analysis result, sending by the data communication controller a notification to the case officer if no suspicious behavior has been detected in the analysis result, and storing the analysis result in a computer readable storage unit.

In yet another embodiment, there is provided a non-transitory computer readable medium on which is stored a computer program for remote monitoring a P/P by the case officer. The computer program comprises computer instructions that when executed by a computing device performs the steps for receiving, through a telecommunication network, a reporting information from the P/P, analyzing by an analyzer the reporting information, obtaining an analysis result, sending by a data communication controller an alert message to a case officer if a suspicious behavior has been detected in the analysis result, sending by the data communication controller a notification to the case officer if no suspicious behavior has been detected in the analysis result, and storing the analysis result in a computer readable storage unit.

The present system and methods are therefore advantageous as they enable case officers to remotely monitor P/Ps in real time. The present system and methods are further advantageous in that they enable officers to predict and stop recidivism. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In the following description, the term "exemplary" is meant only as an example, and does not indicate any preference for the embodiment or elements described. Further, like numerals refer to like elements throughout the several views, and the articles "a" and "the" includes plural references, unless otherwise specified in the description. The terms "parole officer" and "case officer" are used interchangeably, so are "P/P" and "probationer." The "reporting" and "checking in" are also used interchangeably.

In an overview, the present invention provides a remote virtual supervision system that enables a case officer to monitor P/Ps and to spend more time with those P/Ps who may be prone to lapse back into life of crimes. The P/P can "check" in through the remote device by recording a video, audio file, text message, or GPS data transmission on the remote device and the remote device then transmits the recorded GPS, text message, time/date stamp, video or audio file via wireless telecommunications network to a remote supervision server. The remote supervision system will analyze the GPS, text, time/date, audio and video files and then save the analysis result for viewing by a case officer. The remote supervision system will issue alerts if abnormalities are detected through the analysis. The remote supervision system will also use the "check-in" information from each P/P and other environmental information for each P/P, such as job and housing, to perform a risk and need assessment for every P/P. Those P/Ps who are deemed to be in the high risk group will be visited by the case officer more often.

Figure 1:
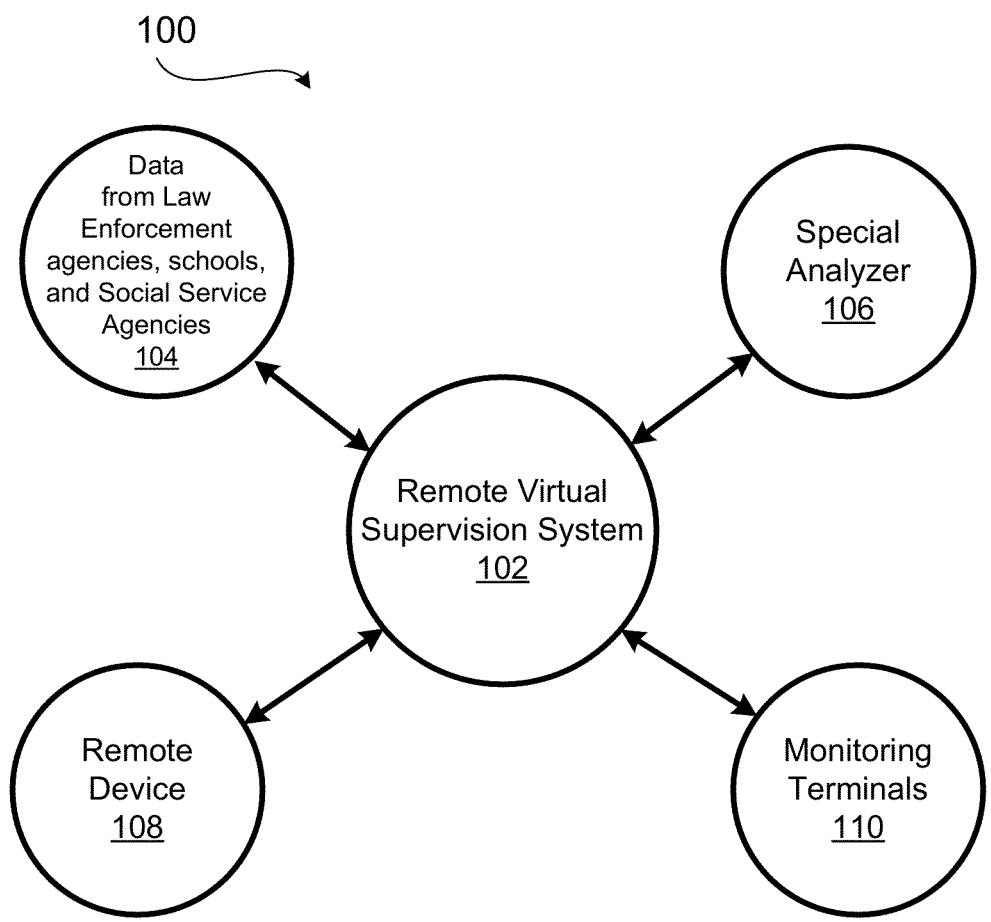
FIG. 1 depicts the relationship between a remote supervising system and other components.

FIG. 1 depicts the relationship 100 between a remote supervision system 102 and other components. The remote supervision system 102 receives check-in information from remote devices 108 and the check-in information, which includes audio and video files and the location (GPS) information on the remote devices 108, is analyzed and made available to case officers who access the analysis result using monitoring terminals 110. The monitoring terminals 110 may be connected to the remote supervision system 102 directly or remotely. The remote supervision system 102 may receive information from law enforcement agencies, schools, and social service agencies 104 and may also make the analysis results available to the law enforcement and social services agencies 104. The remote supervision system 102 may also make the analysis results to a special analyzer 106 that will use the analysis results to help local governments to manage, predict, and reduce criminal activities.

The purpose of the remote supervision system 102 is not only to use information received from the remote device 108 and the law enforcement and social services agencies to generate data for the case officers to track and to monitor the P/Ps, but also to assess risk of recidivism and the need for each P/P. The purpose of the assessment of risk and need for each P/P is to reduce the recidivism rate. The likelihood of recidivism can be predicted using the following function:

Recidivism=F (housing, education, job, sobriety/drug use);

where, housing reflects on P/P's housing condition, who are house mates for the P/P, job reflects on whether P/P has a steady job, education reflects P/P's attendance in training programs, employable skills, and interest in changing behavior, and sobriety/drug use reflects whether P/P is suspected of violating sobriety/drug use conditions of release.

The information from the law enforcement agencies, schools and social services agencies may include the housing information, the sobriety/drug use information, and the job information for the P/P. If the housing information indicates that the P/P is sharing a room with people other than his family, sharing living space with people other than the family members may be prejudicial to the P/P who is trying to return to a normal life because house mates who are not family members may exert undesirable influence on the P/P. If the information from the social services agency indicates that the P/P has a steady job, this is a positive factor and will increase the likelihood of the P/P to return to a normal life and be accepted by the society. The sobriety/drug use information may be received from the law enforcement agencies or derived from the information received from the remote device 108. Information from schools indicates the P/P's positive attendance and performance in class reflects his attitude and intention to improve his behavior.

If the analysis of these four factors indicates that the P/P has higher risk of recidivism, then the remote monitoring system 102 may schedule more case officer visits to this P/P. For P/Ps who have lower risk of recidivism, the remote monitoring system 102 schedules fewer case officer visits. The remote monitoring system 102 will also generate a visiting schedule for each case officer and the visits to each P/P monitored by the case officer. The visits to each P/P are scheduled randomly by the remote monitoring system 102 according to the result of the assessment of risk and needs. The visits are randomized using a gaming theory and an anchored bias to maximize the effect of these visits.

Besides generating a visiting schedule for a case officer, the remote monitoring system 102 is also capable of generating a route for the scheduled visits. Using the P/P's personal information, such as his address or wok location, and traffic information from other online resources, the remote monitoring system 102 can generate a route for the case office to take and the remote monitoring system 102 will be able to schedule the visit for each P/P by taking in consideration the distance between each visit and the projected traffic condition for that route.

Figure 2:
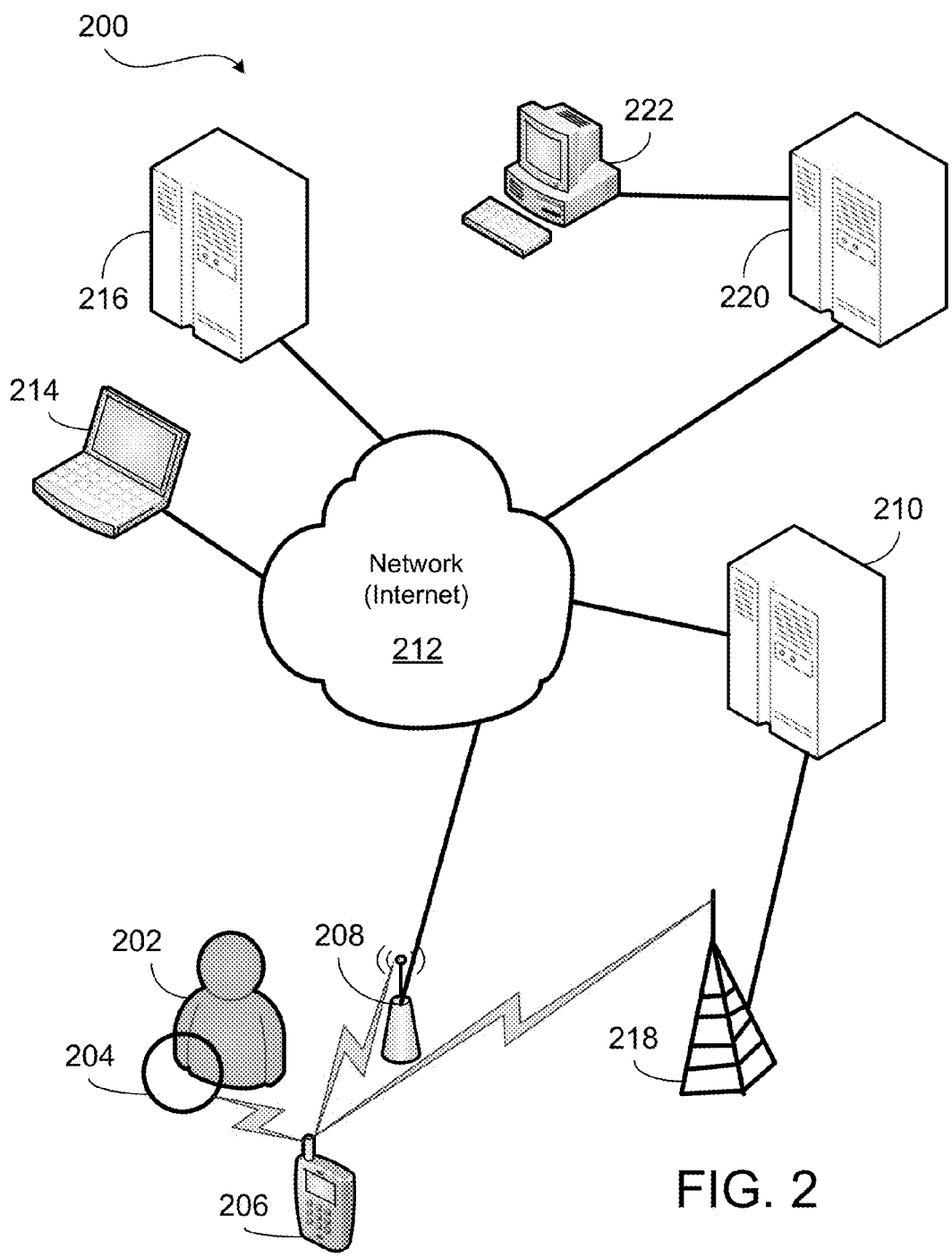
FIG. 2 depicts a system architecture of the remote supervision system according to the invention.

FIG. 2 depicts system architecture of the remote supervision system according to the invention. A P/P 202 may be fitted with a software application ("App") enabled on the P/P's smart phone device 206 that he carries on his body at all times. This App enabled smart phone device 206 periodically communicates with a cell tower 218, which is connected to a base station (not shown). The base station is connected to a mobile switching center (MSC) 210. The mobile switching center 210 is connected to a data communication network (the Internet) 212. A remote server 220, on which the remote monitoring system 102 is executed, that collects information from the remote device 206 is also connected to the Internet 212. The information collected can be accessed through a terminal 222 by a case officer. Optionally, the case officer can also access the information using a mobile computing device (such as a tablet or laptop computer) 214 anywhere through the Internet 212.

A P/P 202 can check in with his case officer by making a GPS data/time-date data/text/audio/video transmission and sending this transmission to the remote supervision server 220. The transmission data will be analyzed by the remote server 220 and the analysis result is stored in the remote supervision server 220 and made available to case officers. The case officers can access the analysis result at their office using attached terminals 222 or remotely through handheld tablet computers 214 in the field. The remote supervision server 220 can also send the analysis results to a server 216 at law enforcement agency or social services agency or receive information from this server 216.

The remote supervision server 220 (remote monitoring system 102) will communicate with the case officer who is out on the field visiting P/Ps 202. The case officer may be carrying a laptop computer 214, a tablet computer, or a smart mobile telephone. The remote supervision server 220 will send the latest updates about the P/Ps that the case officer is monitoring. The remote supervision server 220 will suggest a prioritized list of which P/Ps to visit first for the case officer's visiting schedule according to the latest updates about the P/Ps.

Figure 3:
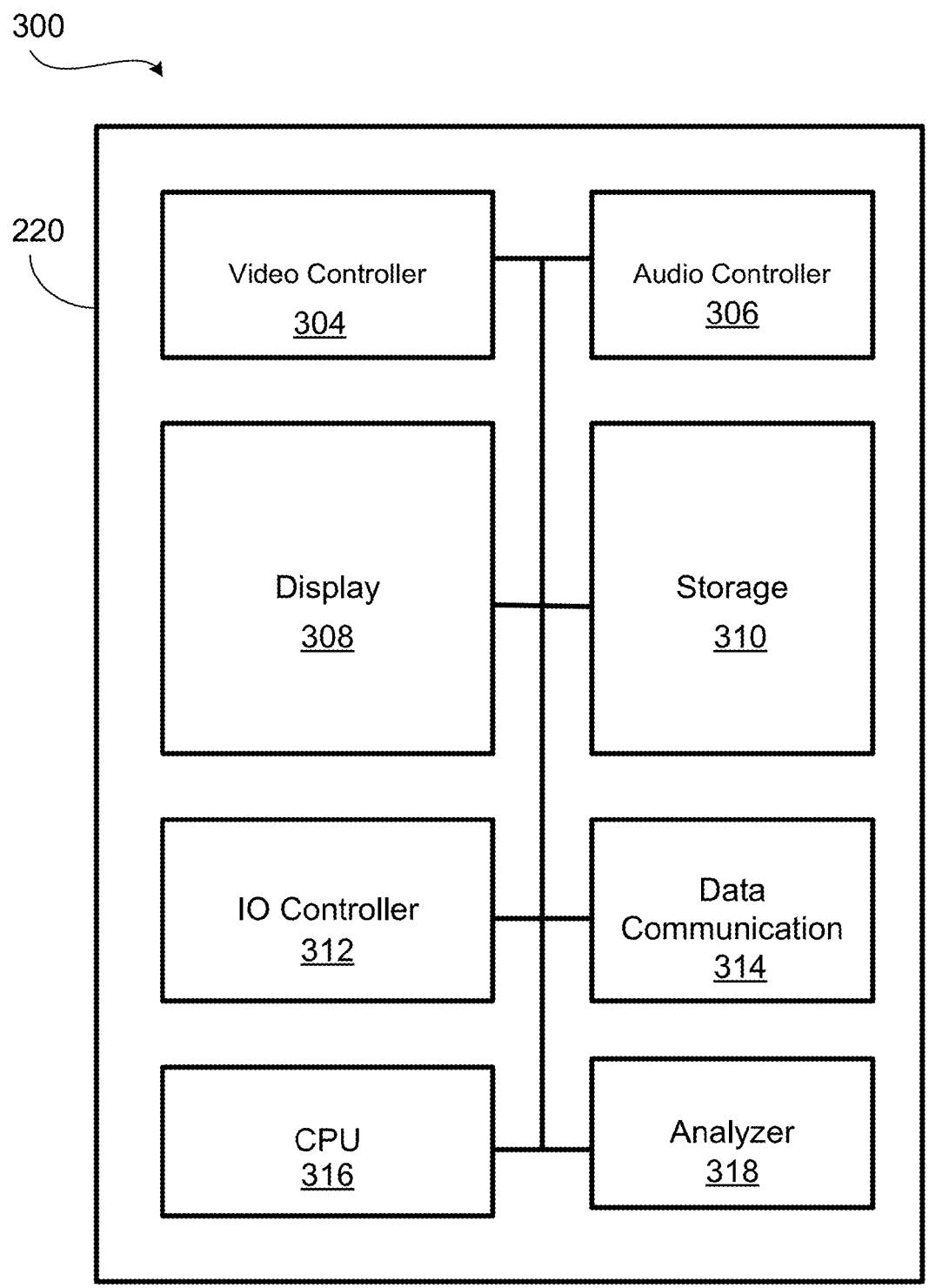
FIG. 3 illustrates architecture of a supervision server for the P/P supervision system.

FIG. 3 is a logic block diagram 300 for a remote supervision server 220. The remote server 220 has a video controller 304 for controlling a video display, an audio controller 306 for controlling audio, a display screen 308, an input/output (IO) controller 312 for controlling user interface, a data communication controller 314 for transmitting and receiving data, analyzer 318 for analyzing video/audio data received from the remote device 206, a central processing unit (CPU) 316, and a storage unit 310. The video controller 304 controls the display of video received from the remote device 206 and the video camera, so a case officer can set up a live chat with a P/P 202. The audio controller 306 controls the display of audio messages. The display screen 308 displays GPS data/time-date data/text/audio/video received from the P/P 202. The 10 controller 312 controls the operation of the display screen 308 and data input and output operations. The data communication controller 314 enables the remote server 220 to send and receive data to and from a remote device 206 and also to communicate with the law enforcement/social services agency server 216. The storage unit 310 is a non-transitory, computer readable storage device and used for storing instructions, GPS data/time-date data/text/audio/video files, and information received from external sources, such as the law enforcement/social services agencies. The CPU 316 controls the operation of the remote supervision server 220 by executing instructions stored in the storage unit 310. The CPU 316 can coordinate operations needed to set up a live chat between the P/P 202 and the case officer. The remote supervision server 220 may also handle the GPS information received from the remote device 206. It is understood that each logic block in FIG. 3 may be implemented by hardware, software, or combination thereof.

The data communication center 314 can receive P/P "risk-needs" data including biographic background data and near real time status data relating to the P/P's participation in community re-entry programs (job training, education, temporary housing, rehabilitation, drug testing, life coaching, and similar re-entry programs) from various third party sources (GPS tracking service, schools, community assistance agencies, etc.). The analyzer 318 can analyze the risk-needs and report data against a set of standard behavior indicators and a set of P/P past behavior indicators. The central control unit 316 manages and prioritizes the activities of the case officers to address those P/Ps at most risk of recidivism if suspicious activities were detected by the analyzer 318. The analysis result is then transmitted to a mobile management device that each case officer carries with him to help him manage his schedule of meetings with P/Ps based on the risk assessment of each case officer's P/P case load.

Figure 4:
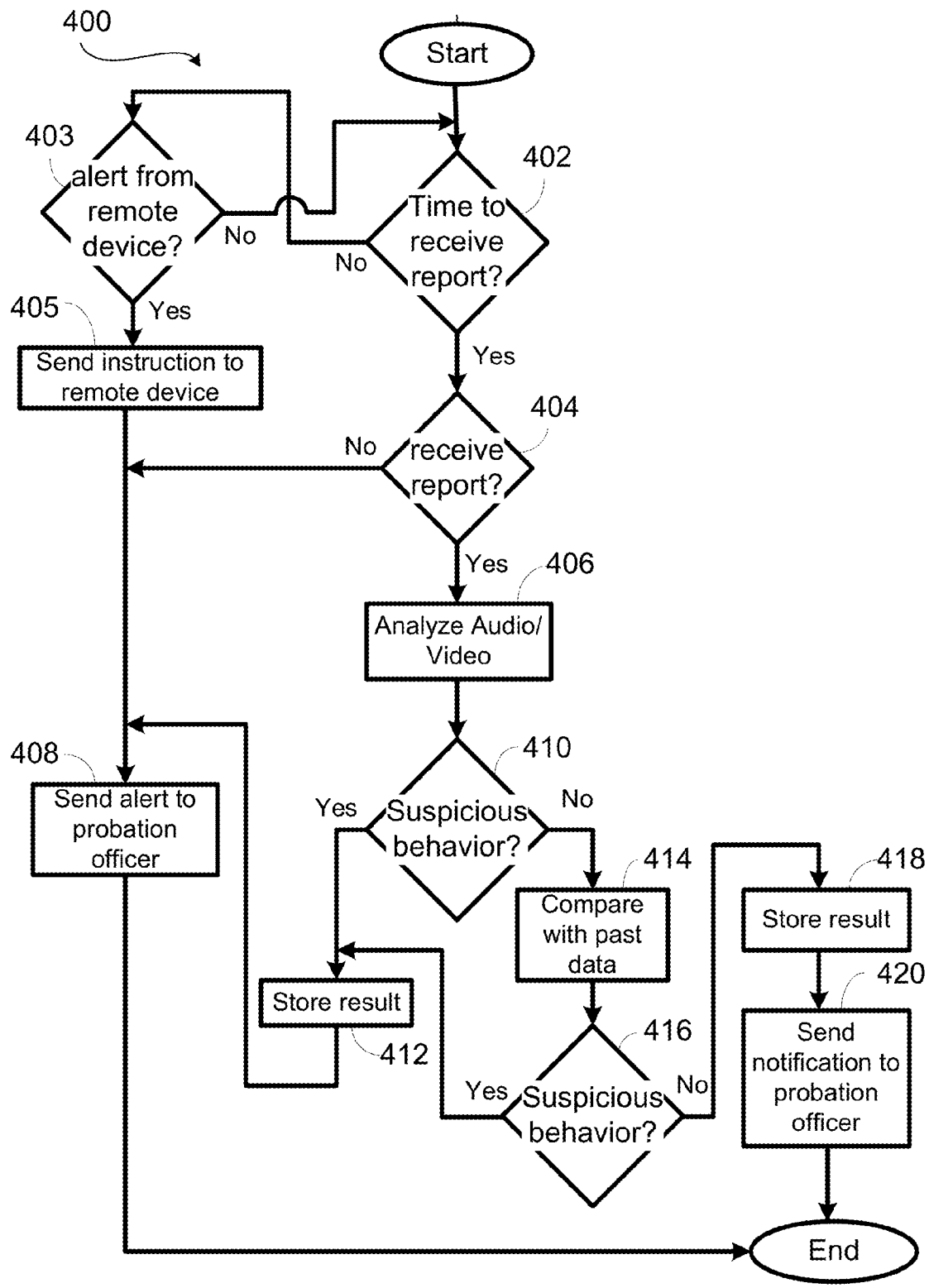
FIG. 4 illustrates a process for a remote monitoring using the present invention.

The remote supervision server 220 allows a P/P to report to his case officer remotely and not in real time. FIG. 4 illustrates a process 400 for the remote supervision server 220. The remote server 220 receives information about P/Ps 202 from other law enforcement agency, such as court or penitentiary system and uses this information to track convicts who have been released on parole. The remote supervision system 220 checks whether it is time to receive information or report from a P/P, step 402, i.e., whether it is time for a P/P 202 to send an audio and video file to the remote supervision system 220. If it is time to receive the reporting information from the P/P 202, the remote supervision system 220 checks whether the report has been received, step 404. If the report has not been received from the P/P 202, the remote supervision server 220 will send an alert to the case officer, step 408, assigned to track this P/P 202. The alert is a message with high level of urgency and can be sent as an email, a text message (SMS) to the case officer's mobile phone, or a telephone call to the case officer.

If the P/P 202 has checked-in remotely by sending a GPS data/time-date data/text/audio/video file, the remote supervision server 220 analyzes the GPS data, text, audio and video files, step 406. The remote supervision server 220 is equipped with an analyzer 318 with a facial recognition program, a voice recognition program, and may also be equipped with a retina scanning program. The analyzer 318 will use these programs to obtain indications of probationer's physical and psychological conditions by first checking against certain standard behavior indicators and then checking against the probationer's own past behavior. The standard behavior indicators may include, for example, a red retina may be an indication of sobriety/drug use, lack of direct eye contact into the camera may be an indication of hiding some information, and blurb speech may be an indication of drunkenness. The remote supervision server 220 uses these specialized programs to check for suspicious behavior, step 410. If a suspicious behavior is detected, the analysis result is stored, step 412, and an alert is sent to the case officer, step 408. The case officer can check the analysis result later and then take appropriate action.

If no suspicious behavior was detected after checking the analyzed result against the standard behavior indicators, the analyzed result is checked against the probationer's own past behavior indicators, step 414. If a probationer acts "normal" but different from his past behavior, this different behavior may also be a concern and to be investigated. If a suspicious behavior is detected, the analysis result will be stored, step 412, for further analysis by the case officer. An alert will be sent to the case officer, step 408. If no suspicious behavior is detected, the analysis result is saved for future use, step 418, and a notification is sent to the case officer, step 420. The notification is a message with low or normal level of urgency. The probationer officer can then review the audio/video file from the P/P 202 and the analysis result at later time.

Besides checking whether it is the time to receive a report from P/Ps 202, the remote supervision server 220 also checks whether there is any alert from the remote device 206. The remote device 206 will automatically send alerts to the remote supervision server 220 if some unusual conditions happen. The unusual conditions may be related to the hardware of the remote device 206 and may also be caused by the P/P's action.

If an alert is received from the remote device 206, the remote supervision server 220 will first send an instruction to the remote device 206, step 405, then send an alert to the case officer, step 408. The instruction sent by the remote supervision server 220 to the remote device 206 may be an instruction for self-diagnostic. If the alert is caused by the P/P 202 action, then instruction sent by the remote supervision server 220 may instruct the remote device 220 to record video/audio without the P/P 202 being aware of.

Figure 5:
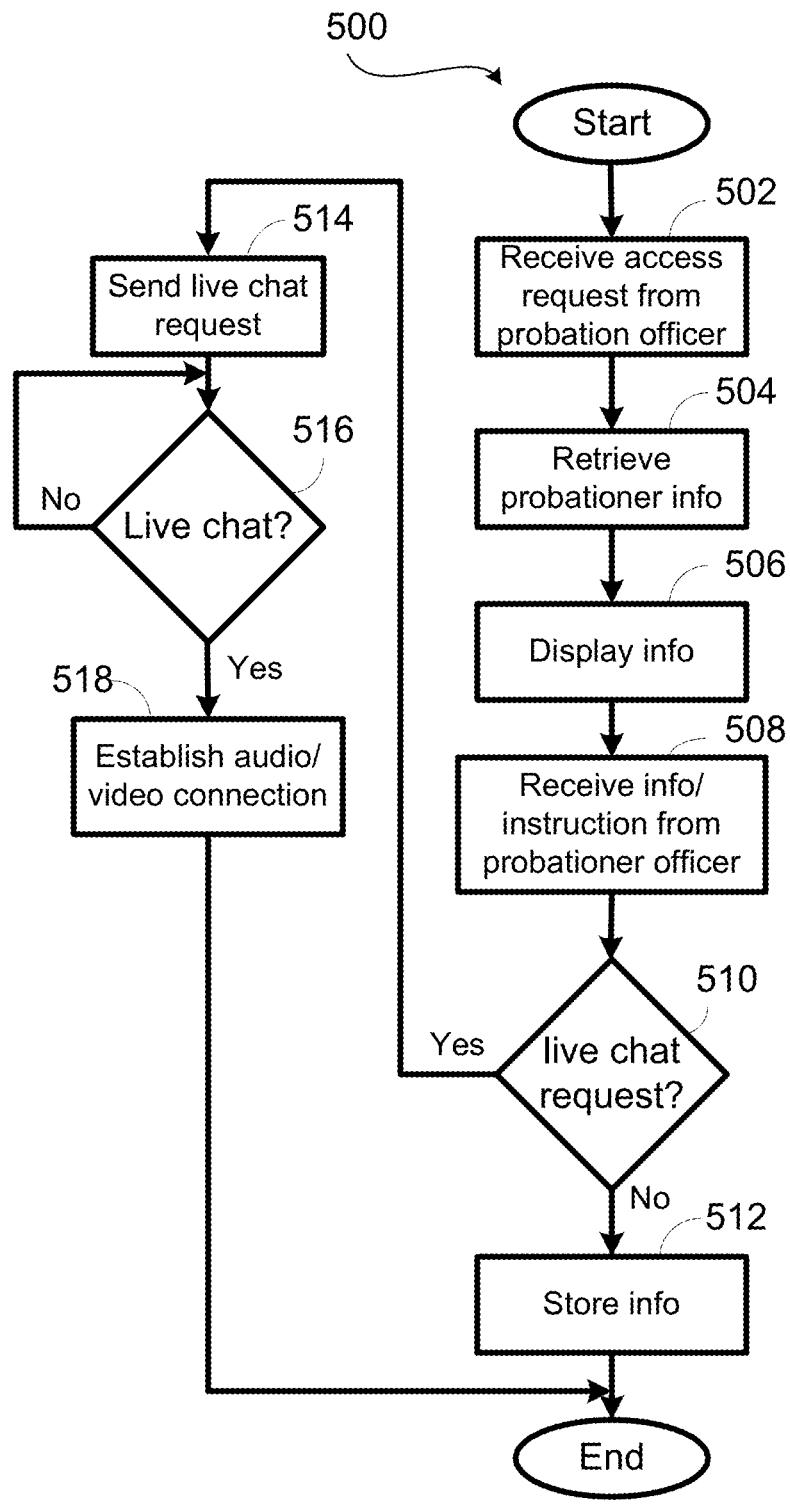
FIG. 5 depicts an interface process between the remote supervision server and a remote probationer officer.

FIG. 5 depicts an interface process between the remote supervision server 220 and a remote probationer officer. After sending an alert or a notification to the case officer, the remote supervision server 220 may receive an access request from the case officer, step 502. The access request may be related to a particular P/P 202. The remote supervision server 220 retrieves the P/P's information, step 504, and displays the information on the display device 308, step 506, if the case officer is in the office. If the case officer is accessing the information remotely, the retrieved information will be sent to the remote terminal (laptop computer) 214 for display. The remote supervision server 220 may receive instruction from the case officer, step 508. The remote supervision server 220 checks if the instruction is for a live chat, step 510. The case officer can use the live chat to check on the P/P 202 and to understand if there is any difficulty or issue that the P/P 202 is facing. If the instruction is not for a live chat request, the remote supervision server 220 will act accordingly and store the information, step 512.

If the instruction is for a live chat request, the remote supervision server 220 send a live chat request to the remote device 206, step 514. The live chat may be for an immediate live chat and may also be scheduled for a later time. The remote supervision server 220 will check if it is time for the live chat, step 516. If it is the time for a live chat, the remote supervision server 220 will establish an audio/video connection between the remote supervision server 220 and the remote device 206.

Figure 6:
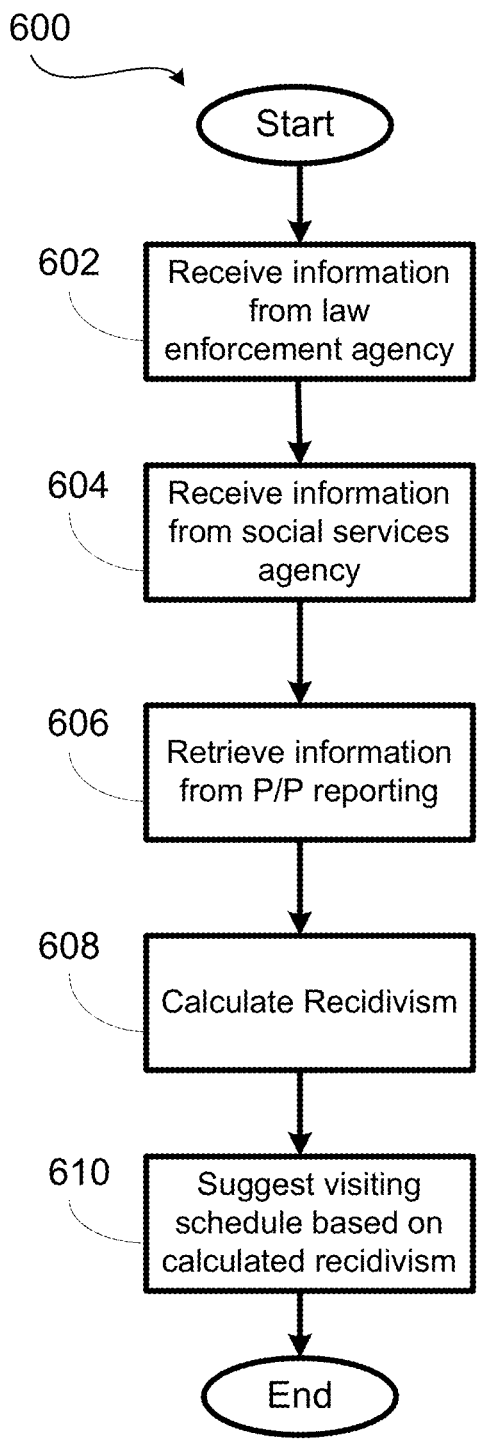
FIG. 6 illustrates a process for calculating the likelihood of recidivism.

FIG. 6 illustrates a process for the remote supervision system 102 to calculate recidivism. The remote supervision system 102 receives information from law enforcement agency, step 602, schools, and social services agency, step 604. The remote supervision system 102 also uses information retrieved from audio and video reporting done by P/P, step 606. The remote supervision system 102 calculates the possibility of recidivism by considering these factors, step 608, and generates a visiting schedule based on the calculation result, step 610, as described above.

When in use, the remote supervision server 220 of the present invention enables parole officer to monitor P/Ps 202 assigned to him remotely and at his convenience. For instance, a convict may be granted probation after serving time in a regular prison and one condition for the probation is for the convict to report regularly to a case officer. The case officer may be assigned to many P/Ps and each P/P may have a different reporting time. On the day for reporting, the P/P 202 can use the remote device 206 to record a short video. The video recording may consists the P/P providing his recent information, such as his current address, whether employed or not, and any other information that may be required by the case officer. The video is stored on the remote device 206 and the remote device 206 will transmit the video file along with other pertinent information, such as time and location of recording, to a remote supervision server 220. The remote supervision server 220 will analyze the GPS data/time-date data/text/audio/video files and make the analysis result available to the case officer. If a suspect behavior is detected during the analysis, the remote supervision server 220 will send an alert with pertinent information to the case officer.

If the P/P 202 is in an area known for high crime activities, the remote device 206 may send an alert to the remote supervision server 220 and the remote supervision server 220 may instruct the remote device 206 to display a message to the P/P 202 advising him to leave the area. The remote supervision server 220 may also instruct the remote device 206 to record GPS data/audio/video silently and later send the data back to the remote supervision server 220 for analysis.

The transmission of the video file or any alert or warning to the remote supervision server 220 is done through wireless transmission via a telecommunication network and it can also be done through Wi-Fi connections. When the video file is transferred to the remote server via the wireless communications network, the transmission of the video file is through a data channel and there is no need for a voice channel. The transmission of the video file is done automatically by the remote device without knowledge by the P/P. The transmission can be done in real time after the video is recorded or in batch mode, i.e., scheduled for a time when there is less network traffic.

The remote supervision server 220 will also allow a case officer proactively monitor P/Ps assigned to him. The remote supervision server 220 will calculate the likelihood of recidivism for each P/P using the information from the reporting done by the P/Ps and the personal information from other law enforcement or social services agencies. The personal information includes housing information, job information, and sobriety/drug use information. The remote supervision server 220 will generate a report on the likelihood of recidivism. For those P/Ps with high possibility of recidivism, the remote supervision server 220 will flag these P/Ps as needing attention from the case officer. The remote supervision server 220 will also generate a visiting schedule and also a visiting route for the case officer.

The method of the present invention can be performed by a program resident in a computer readable medium, where the program directs a computer device, such as a remote device of the present invention, having a computer platform to perform the steps of the method. The computer readable medium can be the memory of the server.

In the context of FIG. 3, the remote supervision server 220 may have different components different from those illustrated in FIG. 3 for multiple components may be combined in a single component and the functions executed by one component in FIG. 3 may be executed by two or more components. In the context of FIGS. 4-5, the steps illustrated do not require or imply any particular order of actions. The actions may be executed in sequence or in parallel.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. An apparatus, for remote monitoring a probationer, comprising:
 a data communication controller for transmitting to and receiving audio and video data from a remote device;
 an analyzer for analyzing audio and video data against a set of standard behavior indicators and a set of probationer past behavior indicators;

a central processing unit for issuing an alert to a case officer if suspicious activities were detected by the analyzer; and a storage unit for storing the set of standard behavior indicators.

2. The apparatus of claim 1 further comprising:
a video controller for controlling display of video data;
an audio controller for controlling audio data; and
a display device for displaying video data.

3. The apparatus of claim 1, wherein the central processing unit further being capable of checking if the audio and video data have been received from the remote device and sending an alert to the case officer if the audio and video data have not been received.

4. The apparatus of claim 1, wherein the data communication controller further being capable of receiving an alert from the remote device and the central processing unit further being capable of sending an instruction, in response to the data communication controller receiving the alert, to the remote device.

5. The apparatus of claim 4, wherein the instruction sent to the remote device instructs the remote device to record audio and to send recorded audio back to the apparatus.

6. The apparatus of claim 4, wherein the instruction sent to the remote device instructs the remote device to record video and to send recorded video back to the apparatus.

7. The apparatus of claim 1, wherein the central processing unit, in response to no suspicious activity has been detected, sends a notification to the case officer.

8. The apparatus of claim 1, wherein the central processing unit being capable of establishing an audio and video connection between the apparatus and the remote device.

9. The apparatus of claim 1, wherein
the data communication center being capable of receiving risk-needs data for a plurality of probationers, including biographic background data and near real time status data relating to probationer's participation in community re-entry programs from various third party sources,
the analyzer being capable of analyzing the risk-needs against a set of standard behavior indicators and a set of past behavior indicators for each probationer, generating an analysis result, and reporting suspicious activities detected in the analysis result, and
the central processing unit being capable of managing and prioritizing activities of a case officer to address a probationer at most risk of recidivism based on the suspicious activities detected by the analyzer.

10. The apparatus of claim 9, wherein the data communication center transmits the resultant analysis to a mobile management device.

11. A method, for remote monitoring a probationer, executed by a supervision server, comprising the steps of:
receiving, through a telecommunication network, reporting information from the probationer;
receiving personal information from third party agencies;
analyzing, by an analyzer, the reporting information;
obtaining an analysis result;
retrieving information from the analysis result;
calculating a possibility of recidivism based on the personal information and the information from the analysis result;
sending, by a data communication controller, an alert message to a case officer if a suspicious behavior has been detected in the analysis result;
sending, by the data communication controller, a notification to the case officer if no suspicious behavior has been detected in the analysis result; and
storing the analysis result in a computer readable storage unit.

12. The method of claim 11, further comprising the steps of:
receiving, through the telecommunication network, an alert from a remote device assigned to the probationer; and
sending, by the data communication controller, in response to receiving the alert from the remote device, an instruction to the remote device.

13. The method of claim 12, wherein the step of sending an instruction to a remote device further comprising the steps of:
instructing the remote server to record audio and video; and
sending the recorded audio and video back to the supervision server.

14. The method of claim 11, further comprising the steps of:
checking if a reporting deadline has passed;
checking if the reporting information has been received if the reporting deadline has passed; and
sending an alert to the case officer if the reporting information has not been received from the remote device assigned to the probationer.

15. The method of claim 11, wherein the step of analyzing, by the analyzer, the reporting information further comprising the step of comparing the reporting information against a set of the standard behavior indicators.

16. The method of claim 11, wherein the step of analyzing, by the analyzer, the reporting information further comprising the step of comparing the reporting information against a set of probationer own behavior indicators.

17. The method of claim 11, further comprising the steps of:
receiving a live chat request from the case officer; and
setting up a live chat between the probationer and the case officer.

18. The method of claim 17, wherein the step of setting up a live chat further comprising the step of establishing an audio/video connection between the remote device and the supervision server.

19. The method of claim 11, further comprising the step of transmitting location information along with a video to the remote server.

20. The method of claim 11, further comprising the step of generating a visiting schedule based on the possibility of recidivism.

* * * * *